(12) United States Patent
Grunwald et al.

(10) Patent No.: US 7,677,374 B2
(45) Date of Patent: Mar. 16, 2010

(54) AXIAL SETTING DEVICE WITH TORQUE DETERMINING MEANS

(75) Inventors: Artur Grunwald, Nümbrecht (DE); Theodor Gassmann, Siegburg (DE)

(73) Assignee: GKN Driveline International GmbH, Lohmar (DE)

( * ) Notice: Subject to any disclaimer, the term of this patent is extended or adjusted under 35 U.S.C. 154(b) by 513 days.

(21) Appl. No.: 10/579,084

(22) PCT Filed: Dec. 9, 2003

(86) PCT No.: PCT/EP03/13928
§ 371 (c)(1),
(2), (4) Date: Jan. 4, 2007

(87) PCT Pub. No.: WO2005/064209
PCT Pub. Date: Jul. 14, 2005

(65) Prior Publication Data
US 2007/0080038 A1    Apr. 12, 2007

(51) Int. Cl.
*F16H 61/06*    (2006.01)
*G01L 3/00*    (2006.01)
*F16D 43/21*    (2006.01)

(52) U.S. Cl. ............... 192/54.52; 73/862.195; 73/862.584; 192/30 W; 192/84.6

(58) Field of Classification Search ............... 192/54.4
See application file for complete search history.

(56) References Cited

U.S. PATENT DOCUMENTS

| 3,108,471 A | * | 10/1963 | Buchele et al. | ........ 73/862.195 |
| 3,664,474 A |   | 5/1972  | Blake et al.   |                    |
| 4,703,663 A | * | 11/1987 | Oppermann      | ............ 73/862.68 |
| 4,903,804 A |   | 2/1990  | Beccaris et al.|                    |
| 5,372,106 A | * | 12/1994 | Botterill      | ................. 123/198 R |

FOREIGN PATENT DOCUMENTS

DE    199 51 946    5/2000

* cited by examiner

*Primary Examiner*—Rodney H Bonck
(74) *Attorney, Agent, or Firm*—Rader, Fishman & Grauer PLLC

(57) ABSTRACT

A method of determining the coupling moment in a friction coupling with an electro-mechanical actuator which comprises a supporting element axially supported in a housing and a displaceable setting element axially supported on said supporting element, wherein the supporting element is axially supported in the housing via an undisplaceably enclosed hydraulic medium and that the pressure in the hydraulic medium is measured and used by lookup tables of values for the actuator and for the friction coupling for the purpose of calculating the coupling moment in a central ECU.

21 Claims, 5 Drawing Sheets

AXIAL SETTING DEVICE WITH TORQUE DETERMINING MEANS

TECHNICAL FIELD

The invention relates to a method of determining the coupling torque in a friction coupling with an electro-mechanical actuator which comprises a supporting element substantially axially fixed in a housing and an axially displaceable selling element supported on said supporting element. The invention also relates to a friction coupling with an electro-mechanical actuator, more particularly for being used in a lockable differential drive or as a hang-on coupling for an optionally drivable driving axis of a motor vehicle, wherein the actuator comprises a supporting disc axially fixed in a housing and a setting disc which is axially supported on said supporting disc.

BACKGROUND

Friction couplings for the range of application mentioned here have torque control purposes, i.e. more particularly they serve to control the distribution of torque at two wheels of a driven axle or between two drivable axles. To be able to carry out suitable control processes, the coupling moment transmitted by the coupling has to be known, i.e. it has to be constantly determined by suitable means. In prior art processes of for determining the coupling moment, the values such as speeds, temperatures etc. are measured by sensors, theoretical values (transmission ratios, efficiency etc.) are calculated, and corrected factors (friction coefficients, efficiency, temperature and speed dependencies etc.) as determined by tests are stored. The measured, calculated and interpolated values are evaluated in a computer or processor unit and the correct current for achieving a calculated coupling moment is set at the electric motor of the actuator. There is thus provided an open loop.

Because of existing non-linearities and deviations in the coupling behavior and in the behavior of the actuator, the coupling moment values set in this way and thus the respective torque values at the wheel or axles in some cases greatly deviate from the theoretical physical values. The degree of accuracy achieved in this way for setting the coupling moment is sometimes not sufficient. Storing the required evaluation tables in an Electronic Control Unit (ECU) or in a processor is complicated and does not allow the complete physical model of the coupling to be copied sufficiently accurately. For evaluating the measured, calculated and interpolated values ECU storage and computer capacity are used and are time-consuming. Several sensors are required for obtaining the required measured values (speed measurements, temperature sensors, etc.).

SUMMARY OF THE INVENTION

It is therefore an object of the present invention to provide a process and a friction coupling of the initially mentioned type by which the coupling torque can be controlled in a less complicated and more accurate way. A process is provided in which the supporting element is axially supported in the housing via an undisplaceably enclosed hydraulic medium, and the pressure in the hydraulic medium is measured and used by using value tables for the actuator and the friction coupling for the purpose of calculating the coupling torque in a central ECU. More particularly, the axial force of the actuator is calculated from the measured pressure, using a stored value for the effective face of the supporting element. Furthermore, the method provides that, by using the stored values for the friction value and for the friction faces of the coupling, the coupling moment is calculated from the supporting force of the supporting element and the axial force of the actuator respectively.

According to another embodiment, the pressure is controlled in a closed control circuit by setting the actuator to a respective nominal value. This means that instead of an open loop, use is made of a closed loop base on the pressure as the only measured or controlled variable.

In this way, the axial setting force is controlled by a closed loop, and for converting the measured pressure into the axial force, only the effective surface of the supporting disc loaded by a hydraulic medium needs to be known and stored; and for calculating the resulting coupling torque, only the friction values of the coupling plates and the mean coupling diameter need to be known and stored in value tables. On the basis of these, the coupling torque required for a certain driving condition is converted by the Electronic Control Unit (ECU) into the nominal value for the axial force of the actuator and the pressure respectively and directly compared with the signal of the pressure sensor by controlling the actuator. The torque calculated on the basis of the axial force can be made available on the vehicle Controller Area Network (CAN) bus.

According to a first solution, the inventive friction coupling is characterised in that the supporting disc is provided in the form of an annular piston in an annular chamber filled with a hydraulic medium and that, in the housing, there is arranged a pressure sensor element for measuring the hydraulic pressure in the annular chamber. The pressure sensor element is connected to a branch line leading to the annular chamber, or the pressure sensor element can be directly introduced into the annular chamber.

An alternative inventive friction coupling is characterised according to a second solution in that the supporting disc is provided in the form of an annular plunger and that into the housing there is inserted an annular housing with a cover, which annular housing and cover form an annular chamber which is filled with a hydraulic medium and in which there is arranged a pressure sensor element for measuring the hydraulic pressure in the annular chamber, wherein the annular plunger acts on the cover. It is possible for the cover to be provided in the form of a flexible diaphragm closing the annular housing. Alternatively, it is possible for the cover to be displaceable in the annular housing and to be sealed relative to the annular chamber.

In any case, the hydraulic medium can be freely selected. However, to avoid any leakage, it is proposed to use a hydraulic medium with a high viscosity, e.g. an oil or gel. For sealing, preference is given to annular seals, but these can be eliminated if the hydraulic medium is formed by an elastic, self-supporting formed member.

BRIEF DESCRIPTION OF THE DRAWINGS

Preferred embodiments of the invention are illustrated in the drawings and will be described below.

DETAILED DESCRIPTION

Figure 1:
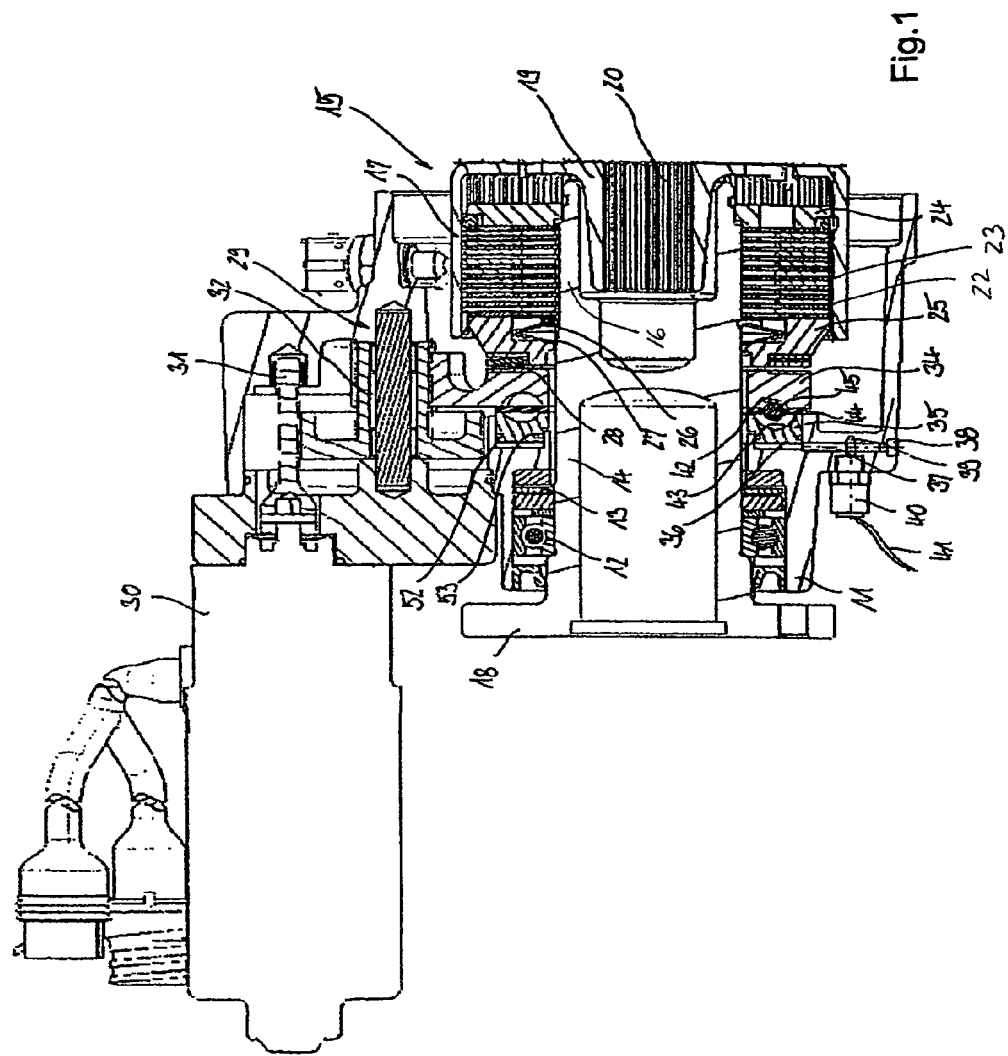
FIG. 1 shows a first embodiment of a multi-plate coupling with an electro-mechanical actuator with hydraulic support.
Figure 2:
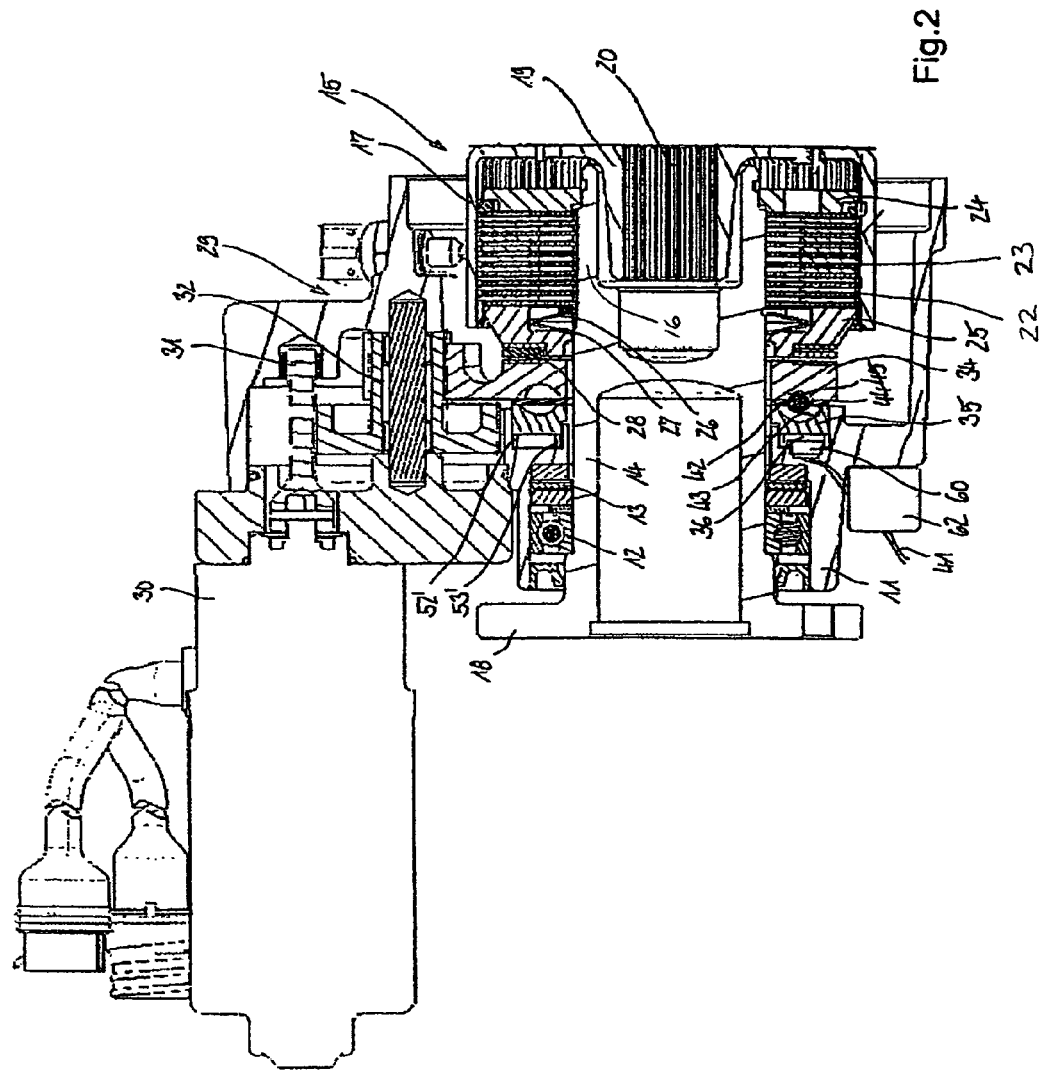
FIG. 2 shows a second embodiment of a multi-plate coupling with an electro-mechanical actuator with hydraulic support.
Figure 3:
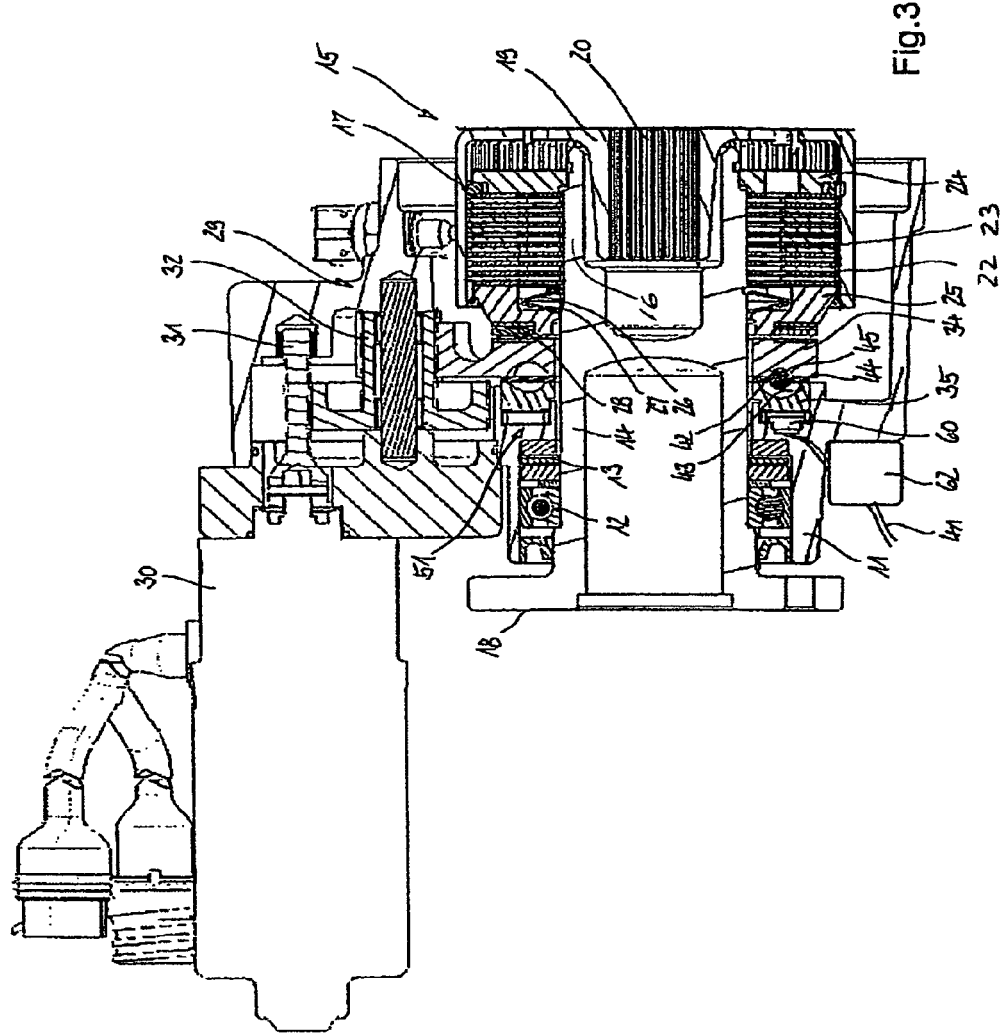
FIG. 3 shows a third embodiment of a multi-plate coupling with an electro-mechanical actuator with hydraulic support.

FIGS. 1 to 3 will initially be described jointly to the extent that the identifiable details correspond to one another. A shaft 14 connected to a multi-plate coupling 15 is supported in a multi-part housing 11 via a ball bearing 12 and an axial bearing 13. The shaft 14 is produced so as to be integral with a hub 16 of the multi-plate coupling, whereas a coupling carrier 17 of the multi-plate coupling is integrally connected to a further hub 19. The shaft 14 comprises a flange 18 for connecting a first shaft suitable for being flanged on; the second hub 19 comprises a shaft toothing 20 for attaching a second shaft suitable for being plugged in. The multi-plate coupling comprises first coupling plates 22 connected to the hub 16 in a rotationally fast way and second coupling plates 23 which are connected to the carrier 17 and which are arranged so as to alternate in the axial direction. The package comprising the first and second coupling plates 22, 23 is supported on a supporting plate 24 secured to the hub 16 and can be axially loaded by a pressure plate 25 which is axially displaceable relative to the hub 16. Between the coupling plates 22, 23 and the pressure plate 25 there is arranged a pair of plate springs 26, 27 for returning the pressure plate. The pressure plate 25, in turn, is displaced via an axial bearing 28 by an axial setting device 29 which can be driven by an electric motor 30. The drive is effected from the shaft 31 of the electric motor via a reduction stage 32 to the axial setting device 29.

In the embodiment as illustrated, the axial setting device (actuator) comprises a pressure or setting disc 34 rotatingly drivable via a tooth segment 33, and of an axially supported supporting disc 35 held in the housing 11 in a rotationally fast way. On their end faces facing one another, the discs 34, 35 comprise ball grooves 42, 43 for balls 45 guided in a cage 44. The ball grooves are arranged in pairs and extend in the circumferential direction, and they comprise gradients extending in opposite directions and variations in depth. When the disc 34 is rotatingly driven relative to the axially supported and rotationally secured disc 35, the balls run from deeper ball groove regions to shallower ball groove regions, as a result of which the disc 34 moves away from the disc 35 towards the multi-plate coupling. The coupling package is closed. When the drive rotates in the opposite direction or when the electric motor 30 is current-less, the returning force of the plate springs 26, 27 causes the disc 34 to be pressed back and, under the effect of the balls 45 in the ball grooves 42, 43, it is rotated back.

In the embodiment according to FIG. 1, the supporting disc 35 is provided in the form of an annular piston which is held, so as to be axially free and rotationally secured, in an annular cylindrical chamber 36 filled with a hydraulic medium. The disc 35 is sealed relative to the chamber 36 by sealing rings 52, 53 positioned on the piston face. From the chamber 36 there starts a radial bore 37 which is closed by a threaded plug 38. A transverse bore 39 passing through the radial bore 37 is connected to a pressure sensor element 40 having integrated sensor electronics. The chamber 36, the radial bore 37 and the transverse bore 39 are completely filled with a hydraulic medium, so that the disc is axially firmly supported mainly by the hydraulic medium. The pressure sensor 40 measures the pressure in the cylindrical chamber 36 and, via a cable 41, transmits the measured values to an ECU in which the measured pressure is converted in the initially described way into the actually transmissible coupling moment.

FIG. 2 shows the supporting disc 35 in the form of an annular piston which is held, to as to be axially free and rotationally secured, in an annular cylindrical chamber 36 which is filled with the hydraulic medium. The disc 35 is sealed relative to the chamber 36 by sealing rings 52', 53' arranged in the chamber 36. A pressure sensor element 60 introduced into the housing is arranged in the chamber 36. The pressure sensor element records the pressure in the cylindrical chamber 36 and transmits a pressure signal into a pressure sensor Electronic Control Unit (ECU) 62 which is arranged at the housing and in which, in the initially described way, the measured pressure is converted into the actual coupling moment, with the calculated value, via a bus of the motor vehicle, being made available for further use.

In FIG. 3, the supporting disc 35 is provided in the form of an annular piston which, so as to be axially free and rotationally secured, is held in an annular cylindrical chamber 36 into which an annular housing 51 filled with a hydraulic medium is inserted without any play. In this embodiment, the disc 35 does not have to be sealed relative to the chamber 36. A pressure sensor element 60 introduced into the housing is arranged in the annular housing 51. The pressure sensor element records the pressure in the annular housing 51 and transmits a pressure signal into a pressure sensor Electronic Control Unit (ECU) 62 which is arranged at the housing and in which, in the initially described way, the measured pressure is converted into the actual coupling torque.

Figure 4:
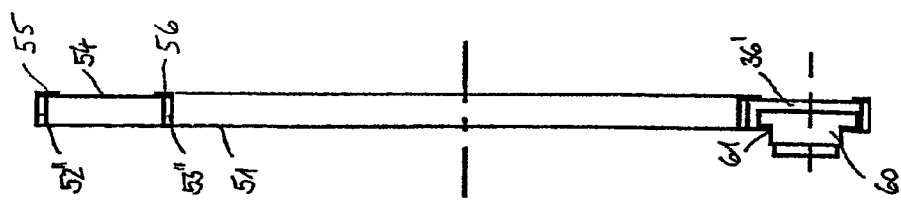
FIG. 4 shows the pressure recording element according to FIG. 3 in an enlarged form.

In FIG. 4, the annular housing 51 according to FIG. 3 is shown in an enlarged form as a detail. It is possible to see an annular housing 51 at whose inner circumference and outer circumference there have been inserted seals 52", 53". At one end face, there is inserted a flat annular cover 54 which is sealingly held by two beadings 55, 56 relative to the seals 52", 53". The annular housing 51 is completely filled with a hydraulic medium. At one circumferential place of the housing 51, there is inserted a pressure sensor element 60 whose attaching end is guided out of the housing through a bore 61. The cover 54 is provided in the form of an elastic diaphragm or in the form of a displaceable cover which is permanently sealed by the seals 52, 53 and which is axially acted upon by the supporting disc.

Figure 5:
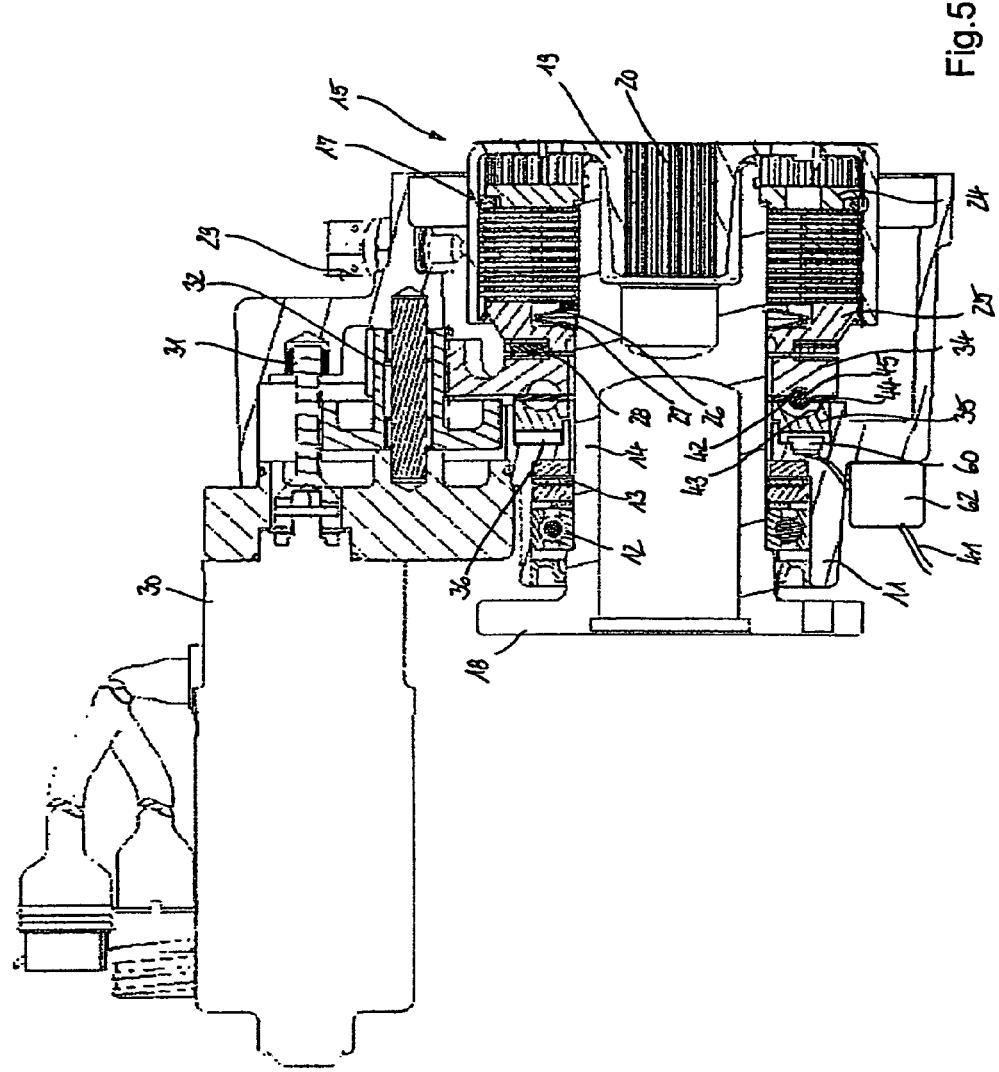
FIG. 5 shows a fourth embodiment of a multi-plate coupling with an electro-mechanical actuator with hydraulic support.

In FIG. 5, the supporting disc 35 is provided in the form of an annular piston 35 which, in an axially free and rotationally fastened way, is held in an annular chamber 36 filled with a hydraulic medium. The consistency of the hydraulic medium is such that the disc 35 does not have to be sealed relative to the chamber 36. For instance, the hydraulic medium can be provided in the form of a two-component gel which is filled into the chamber in a liquid form and then gels. Alternatively, the hydraulic medium can be a prefabricated formed member, e.g. a silicone disc. In this case, too, a pressure sensor element 60 is introduced into the chamber 36, which records the pressure in the cylindrical chamber 36 and transmits a pressure signal to a pressure sensor electronic system mounted on the housing 11. For the rest, reference is made to the previous embodiments.

LIST OF REFERENCE NUMBERS 11 housing
12 ball bearing
13 axial bearing
14 shaft
15 multi-plate coupling
16 coupling hub 17 coupling carrier
18 flange
19 hub
20 shaft assembly
21
22 coupling plates
23 coupling plates
24 supporting plate
25 pressure plate
26 plate spring
27 plate spring
28 axial bearing
29 axial setting device (actuator)
30 electric motor
31 shaft
32 reduction stage
33 tooth segment
34 setting disc
35 supporting disc
36 annular cylinder
37 radial bore
38 plug
39 transverse bore
40 pressure sensor element with integrated electronic system
41 cable
42 ball groove
43 ball groove
44 cage
45 ball
51 annular housing
52 seal
53 seal
54 cover
55 beading
56 beading
60 pressure sensor element
61 bore
62 pressure sensor electronic system

The invention claimed is:

1. A method of determining the coupling torque in a friction coupling with an electro-mechanical actuator comprising a supporting element axially supported in a housing and an axially displaceable setting element supported on said supporting element, the method comprising:
axially supporting the supporting element in the housing via an undisplaceably enclosed hydraulic medium; measuring the pressure in the hydraulic medium; and calculating the coupling torque in an electronic control unit as a function of the measured pressure and a lookup table of values for the actuator and the friction coupling; wherein an axial setting force of the actuator is controlled by the electronic control unit on the basis of the calculated coupling torque.

2. A method according to claim 1, wherein the axial setting force of the actuator and a supporting force of the supporting element are calculated as a function of the pressure in the hydraulic medium, using a stored value for the effective face of the supporting element.

3. A method according to claim 2 comprising controlling the pressure in the hydraulic medium in a closed control circuit by setting the actuator to a respective nominal value.

4. A method according to claim 2, wherein a coupling moment is calculated, using stored values for a friction value, and the friction face of the friction coupling is calculated as a function of the axial setting force of the actuator and the supporting force of the supporting element.

5. A method according to claim 4 comprising controlling the pressure in the hydraulic medium in a closed control circuit by setting the actuator to a respective nominal value.

6. A method according to claim 1 comprising controlling the pressure in the hydraulic medium in a closed control circuit by setting the actuator to a respective nominal value.

7. An assembly comprising:
a friction coupling with an electro-mechanical actuator, the actuator comprising a supporting disc axially fixed in a housing and an axially displaceable setting disc being axially supported on said supporting disc, wherein the supporting disc is provided in the form of an annular piston in an annular chamber filled with a hydraulic medium; a pressure sensor element arranged in the housing for measuring the hydraulic pressure in the annular chamber; and an electronic control unit for calculating the coupling torque as a function of the measured pressure, wherein an axial setting force of the actuator is controlled by the electronic control unit on the basis of the calculated coupling torque.

8. An assembly according to claim 7, wherein the pressure sensor element is connected to a branch line leading to the annular chamber.

9. An assembly according to claim 8, wherein the supporting disc is sealed relative to the annular chamber by sealing rings.

10. An assembly according to claim 7, wherein the pressure sensor element is introduced directly into the annular chamber.

11. An assembly according to claim 10, wherein the supporting disc is sealed relative to the annular chamber by sealing rings.

12. An assembly according to claim 7, wherein the supporting disc is sealed relative to the annular chamber by sealing rings.

13. An assembly according to claim 12, wherein the hydraulic medium forms an elastic formed member.

14. An assembly according to claim 7, wherein the hydraulic medium forms an elastic formed member.

15. An assembly comprising:
a friction coupling with an electro-mechanical actuator, the actuator comprising a supporting disc axially fixed in a housing and a displaceable setting disc which is axially supported on said supporting disc, wherein the supporting disc is provided in the form of an annular plunger; an annular housing with a cover inserted into the housing, which annular housing and cover form an annular chamber which is filled with a hydraulic medium; a pressure sensor element arranged in fluid communication with the annular chamber for measuring a hydraulic pressure in the annular chamber, wherein the annular plunger acts on the cover; and an electronic control unit for calculating the coupling torque as a function of the measured pressure, wherein an axial setting force of the actuator is controlled by the electronic control unit on the basis of the calculated coupling torque.

16. An assembly according to claim 15, wherein the cover is provided in the form of a flexible diaphragm.

17. An assembly according to claim 16, wherein the supporting disc is sealed relative to the annular chamber and the cover relative to the annular chamber, respectively, by sealing rings.

18. An assembly according to claim 15, wherein the cover is displaceable in the annular chamber and sealed relative thereto.

19. An assembly according to claim 18, wherein the supporting disc is sealed relative to the annular chamber and the cover relative to the annular chamber, respectively, by sealing rings.

20. An assembly according to claim 15, wherein the supporting disc is sealed relative to the annular chamber and the cover relative to the annular chamber, respectively, by sealing rings.

21. An assembly according to claim 15, wherein the hydraulic medium forms an elastic formed member.

* * * * *